United States Patent [19]

LoJacono, Jr. et al.

[11] Patent Number: 5,246,254
[45] Date of Patent: Sep. 21, 1993

[54] ANTI-KINKING DEVICE FOR GARDEN HOSES

[75] Inventors: Francis X. LoJacono, Jr., Templeton; Robert M. Hooper, Atascadero, both of Calif.

[73] Assignee: Francis X. LoJacono, Sr., Laguna Niguel, Calif.

[21] Appl. No.: 976,256

[22] Filed: Nov. 13, 1992

[51] Int. Cl.$^5$ .................. F16L 55/00; F16L 11/00
[52] U.S. Cl. ..................................... 285/16; 138/109; 138/110; 285/114
[58] Field of Search ............... 138/109, 110, DIG. 8, 138/178, 172; 285/16, 114

[56] References Cited

U.S. PATENT DOCUMENTS

| | | | |
|---|---|---|---|
| 790,971 | 5/1905 | Nicholls | 138/DIG. 8 |
| 2,185,741 | 1/1940 | Sorg et al. | 138/61 |
| 2,277,864 | 3/1942 | Horvath | 138/110 |
| 2,640,502 | 6/1933 | Powers | 138/110 |
| 2,905,194 | 9/1959 | Smith et al. | 138/110 |
| 3,032,357 | 5/1962 | Shames et al. | 138/DIG. 8 |
| 3,610,289 | 10/1971 | Moss | 138/110 |
| 3,889,717 | 6/1975 | Obadal et al. | 138/110 |
| 4,456,034 | 6/1984 | Bixby | 138/131 |
| 4,966,741 | 10/1990 | Rush et al. | 138/178 |

FOREIGN PATENT DOCUMENTS

| | | | |
|---|---|---|---|
| 534263 | 3/1941 | United Kingdom | 138/110 |
| 626836 | 7/1949 | United Kingdom | 138/110 |
| 2028964 | 3/1980 | United Kingdom | 138/DIG. 8 |
| 2149049 | 6/1985 | United Kingdom | 138/110 |

Primary Examiner—Eric K. Nicholson
Attorney, Agent, or Firm—Francis X. LoJacono

[57] ABSTRACT

An anti-kinking device used in conjunction with a garden variety water hose, wherein the device includes a housing defined by a tubular body having a coupling member rotatably mounted to the tubular body so as to be connected to a water faucet, wherein the opposite end of the tubular body is threaded so as to connect to a garden-type hose, and further includes an elongated flexible nylon cable that is fixedly secured to a boss member formed in the internal wall of the tubular body, whereby the cable is formed with a length so as to be readily positioned within the full length of the hose.

9 Claims, 1 Drawing Sheet

ANTI-KINKING DEVICE FOR GARDEN HOSES

BACKGROUND OF THE INVENTION

1. Field of the Invention

The present invention relates generally to an anti-kinking device used in conjunction with garden variety water hoses and more particularly to an anti-kinking device that includes a female coupling connector defined by a tubular body having a rotatable coupling member adapted to be connected to a garden-type water faucet and an opposite threaded end to receive the female coupling member commonly mounted at the water inlet end of a hose. The device includes an elongated, simi-rigid nylon cable that is fixedly secured to a boss member formed in the internal wall of the tubular body so as to be positioned within the garden-type hose, the cable extending approximately the full length of the hose, whereby the hose is prevented from kinking along its entire length.

2. Description of the Prior Art

There has been and still exists a long-standing problem of kinking in hoses of the garden type which commonly range in lengths of 25, 50 and 75 feet, wherein the diameters range between one inch to one-half inch. Hoses of all sizes have an inherent problem of kinking at one or more points along the body of the hose due to exposure at high outdoor temperatures and more particularly to direct sunlight, causing the wall structure of a hose to become soft and readily pliable. Many methods and devices have been tried to prevent kinking in various types of short hoses, and in particular hoses that are used in conjunction with vehicles and other types of systems that employ very short hoses mounted within flow systems. However, the difficulties and problems of kinking are still being encountered in common types of garden hoses. Until now, providing a suitable means to prevent kinking at any point along the full length of a hose, especially when it is rolled up for storage or when unrolled for use, has not been available within the known art.

There have been many types of hoses designed to overcome kinking. Some manufactures have attempted to solve the kinking problem by forming the wall structures of the hoses from different combinations of chemical compositions. Thus, hoses can be found composed of rubber or a combination of rubber and plastics as well as many varieties of plastic materials, including impregnating the wall structures of hoses with nylon and metal strands. However, due to the outdoor environment in which garden and like hoses are usually kept, the compositions of these known hoses have a tendency to lose their resiliency and flexibility after long periods of exposure to changing ambient temperatures and weather. Thus, when left for a considerable time exposed to variant temperatures and to direct sunlight, a hose will deteriorate and become unmanageable during use or when it is to be coiled for storage.

Mechanical means have been tried for many types of hoses, including the typical garden variety, and the following are some examples.

In U.S. Pat. No. 2,185,741 to L. F. Sorg et al there is disclosed a hose attachment which is defined by a flexible connector for a hose and is more specifically used to provide means for preventing the kinking and breakage of a hose at the point where short bending is likely to occur, such as the end where a water hose is connected to a hydrant. This invention uses a short length of a coil spring that is mounted about the exterior wall of the connection end of the hose. However, it does not protect the entire length of the hose itself.

In U.S. Pat. No. 3,610,289 to Moss there is disclosed an air line consisting of a helically coiled tube of thermoplastic material in which metal coiled springs extend partially along the air line from each end thereof. The two springs are interconnected to each other by a resilient wire.

U.S. Pat. No. 3,889,717 to R. D. Obadal et al discloses a reinforced flexible hose for use with a coolant system of an internal combustion engine.

In the British Patent 534,263 to A. J. Prestage an elongated small-diameter spring is positioned within the core of a rubber tube wherein the diameter of the spring is substantially less than the internal diameter of the tube.

Co-inventor Robert M. Hooper of the present application has three patent applications pending in the United States Patent and Trademark Office as follows: Ser. No. 07/682,934 now abandoned; Ser. No. 07/683,026 now Design Pat. No. D330,834 and a continuation-in-part application Ser. No. 07/885,841. These inventions disclose a flexible cable that is fixedly attached to a mounting washer. This mounting arrangement has been found to have operational failures due to the fixed relationship between the cable and the supporting washer. Separation occurs between the washer and the cable when the hose is frequently mounted to or removed from a water outlet. Accordingly, the present invention has been designed to overcome this problem by the novel mounting device in which the cable is secured.

SUMMARY OF THE INVENTION

The present invention comprises an anti-kinking device for preventing a hose, more particularly the garden-type variety, from kinking at any random location along the length of the hose. The anti-kinking device is defined by an interconnecting unit that comprises a tubular housing adapted to be mounted between a water faucet and the coupling end of a hose. The tubular housing is provided with a faucet coupling member that is rotatably mounted to one end of the tubular housing so as to be attached to the threaded discharge end of the water faucet, the opposite end of the tubular housing being formed with an extended threaded neck portion that is adapted to be secured to the inlet end of the female coupling end which is rotatably mounted to a typical garden hose. Thus, the tubular housing is adapted to be mounted between the water faucet and the rotatable female inlet connector or coupling of the hose. The tubular housing of the anti-kinking device includes an elongated, semi-rigid cable, preferably a nylon cable that is fixedly secured to an inner elongated boss member formed on the surface of the inner wall that defines the housing. The cable is inserted in the hose so as to extend approximately the full length of the hose. Once the cable is in place the female connector or coupling of the hose is rotated so as to be secured to the extended neck of the lower portion of the tubular housing. When the housing is secured to the hose it is then connected to the faucet by means of the coupling or connector that is rotatably mounted to the tubular housing. Accordingly, this arrangement prevents the cable from rotating within the body of the hose. The cable length is to be just slightly less than the length of the hose with which the cable is to be used, and thus the hose is prevented from kinking along any section throughout its entire length, no matter how weak or soft the casing of the hose becomes.

The present invention has for an important object to provide an anti-kinking device for garden-type hoses that comprises a simple but workable tubular housing having an elongated cable member adapted to be readily coupled or secured between a hose and a water faucet wherein the cable attached to the tubular housing is freely mounted within the casing of the hose so as not to rotate within the hose when the hose is being mounted or removed from the water faucet.

Another object of the invention is to provide an anti-kinking device for hoses that includes a cable that is freely supported within the hose so as not to interfere with the flow of water but still allow the hose to be readily extended for use without kinking while it is being uncoiled from a stored mode.

Still another object of the present invention is to provide a device of this character that allows the hose together with the anti-kinking device to be readily removed from one faucet and connected to another faucet at a different location by simply rotating the freely rotatable connector mounted to the tubular housing.

It is another object of the present invention to provide an anti-kinking device of this character that is readily inserted in any size garden hose to make the hose kink-free, even if the hose has been weakened by being exposed to an unfavorable environment.

A further object of the invention is to provide a device of this character that is easy to install and simple to maintain.

It is a further object of the present invention to provide an anti-kinking device for hoses that is relatively inexpensive to manufacture, and is both simple and rugged in construction.

The characteristics and advantages of the invention are further sufficiently referred to in connection with the accompanying drawings, which represent one embodiment. After considering this example, skilled persons will understand that variations may be made without departing from the principles disclosed; and we contemplate the employment of any structures, arrangements or modes of operation that are properly within the scope of the appended claims.

BRIEF DESCRIPTION OF THE DRAWINGS

With the above and related objects in view, the invention consists in the details of construction and combination of parts, as will be more fully understood from the following description, when read in conjunction with the accompanying drawings and numbered parts in which.

DESCRIPTION OF THE PREFERRED EMBODIMENT

Figure 1:
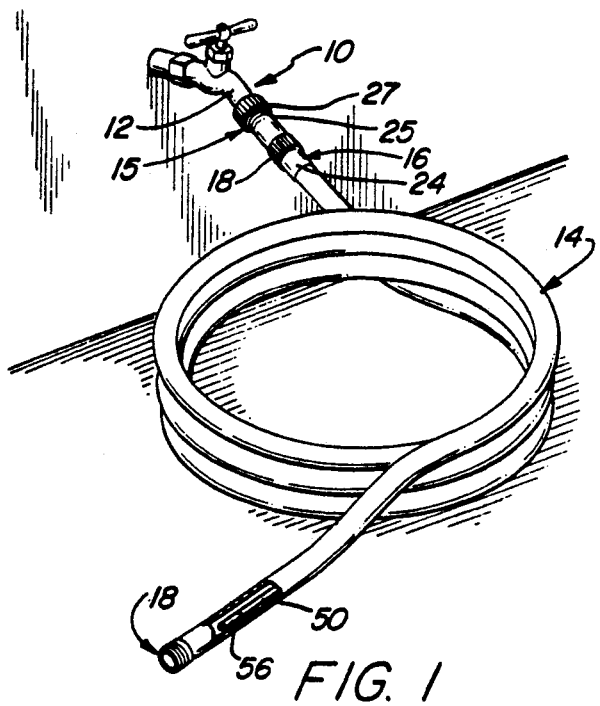
FIG. 1 is a pictorial view of a garden-type hose connected to a water faucet by means of the present invention which is shown installed between the water faucet and the inlet connecting end of the hose, the discharge end of the hose being broken away to show the free end of the anti-kinking cable.
Figure 2:
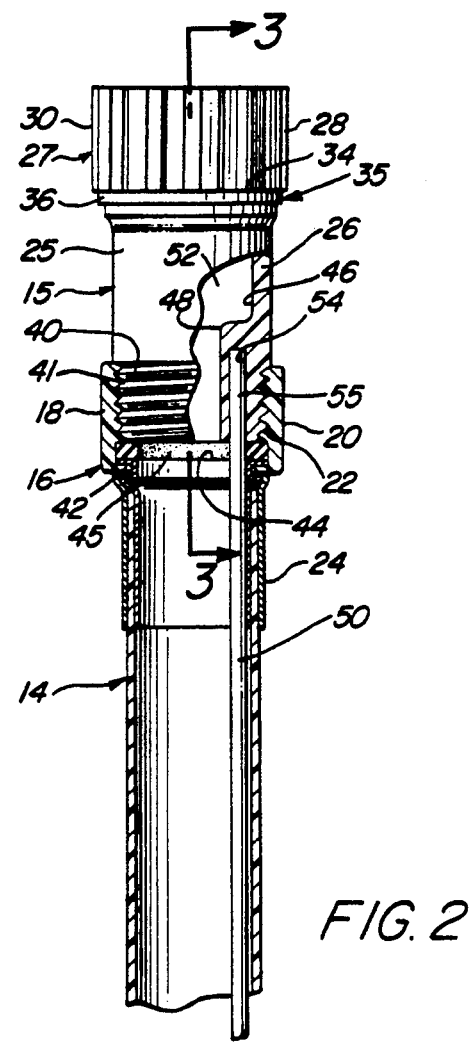
FIG. 2 is an enlarged view of the cable support housing secured to the coupling end of hose, wherein a portion of the cable support housing is shown broken away together with the hose in cross-section to show the position of the cable within the hose.

Referring now in more detail to the drawings and more particularly to FIG. 1, there is illustrated a garden-type water faucet or valve means, generally indicated at 10, having a threaded spout member 12 that is commonly formed at the discharge end of faucet means 10 and a hose 14 of the typical garden-type variety having an inlet end 16 and outlet end 18. Interconnected between water faucet means 12 and inlet end 16 of hose 14 is the present invention, which is hereinafter referred to as an anti-kinking device, designated generally at 15, that is adapted to be removably secured to both the threaded spout member 12 and the inlet end 16 of hose 14. The inlet end 16 is defined by a female coupling member 18 formed having an annular wall 20 in which is commonly provided suitable threads 22, as illustrated in FIG. 2. Coupling member 18 is rotatably mounted to a double-wall sleeve member 24 in a suitable well known arrangement.

Figure 3:
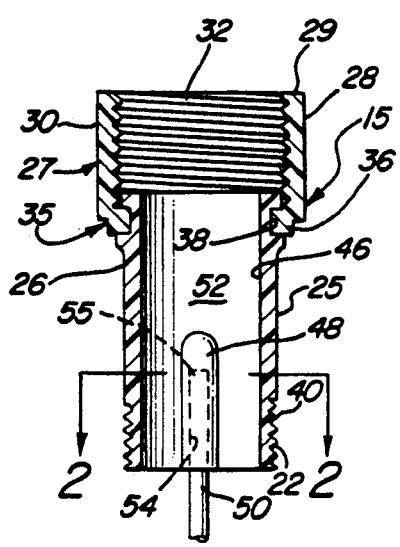
FIG. 3 is a cross-sectional view taken substantially along line 3—3 of FIG. 2, and showing the cable support housing removed from the hose.
Figure 4:
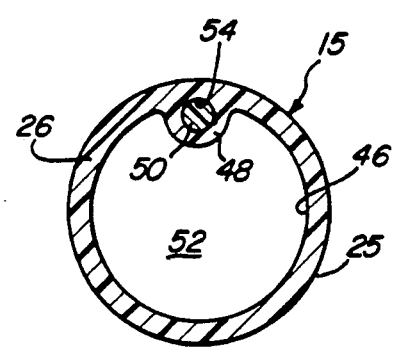
FIG. 4, is an enlarged cross-sectional view taken along line 4—4 of FIG. 3.

Anti-kinking device 15 is specifically designed to prevent kinking throughout the full length of the hose and is formed having a cable support housing 25 defined by a tubular body member 26 which includes a faucet coupling means 27 defined by a rotatable female connector 28, as indicated in FIG. 3. Female connector 28 is formed having an annular wall 30 which includes an internal threaded surface 32 that is suitable for mounting to threaded spout member 12. Annular wall 30 defines an upper open end 29 and a lower end 34 that is formed by an annular flange member 36 which provides a rotatable mounting means, designated at 35. Flange member 36 is arranged to be freely received in a corresponding annular groove 38 formed in cable support housing 25 adjacent the upper end thereof, as seen in FIG. 3 of the drawings. Accordingly, female connector 28 is free to rotate within groove 28 about tubular body member 26 of housing member 25, as illustrated in FIG. 3. The lower end 40 of the tubular body member 26 is provided with suitable external threads 41 which are adapted to be threadably received in the rotatable female coupling member 18 of hose 14, as illustrated in FIG. 2. As mentioned above, female coupling member 18 is also rotatably mounted to hose 14 which is provided with a double-wall sleeve member 24 which includes an annular groove 42 in which coupling member 18 is rotatably mounted. In forming annular groove 42 a shoulder 44 is created and acts as a seat on which a typical hose washer 45 is positioned. (See FIG. 2.) The lower threaded end 29 of tubular body member 26 is thereby secured in coupling member 18.

The inner surface 46 of tubular body member 26 is formed having a vertically disposed elongated boss member 48 which defines a means for fixedly securing a flexible cable 50. The flexible cable which is composed preferably from a nylon material is fixedly secured to tubular body member 26 by means of boss member 48 which is formed in inner surface 46 so as to extend from the bottom opening of body member 26 upwardly into passageway 52. The boss member 48 can be of any suitable length but preferably an inch or more so that a sufficiently elongated deep bore 54 can be formed therein to securely receive the connecting end 55 of cable 50. For best results in securing cable 50 within bore 54, the nylon cable should have a suitable diameter of between 1/8 to ⅛ of an inch. The connecting end 55 can be secured therein by any suitable means or methods such as adhesives or the like. However, the preferable method of securing the cable 50 to boss 48 is to insert cable end 55 in bore 54 when the plastic material of the housing is still in a warm semi-soft state. Accordingly, as the material cools it will shrink, thus gripping the cable therein in the manner of a vise grip, and will not allow the cable to be separated or pulled apart from cable housing 25. The length of the cable will be determined by the length of the hose. That is, the length of the cable will be sufficient to reach a point adjacent to the outlet end 18 of a particular length of hose, as illustrated in FIG. 1 wherein outlet end 18 of hose 14 is shown broken away so as to show the suggested position of the free end 56 of cable 50.

When mounting the cable support housing 25 to the hose coupling 20, cable 50 is inserted into hose 14 until threads 40 of cable support housing 25 are in position to engage threads 22 of coupling 18, at which time coupling 18 is rotated so as to be screwed to cable support housing 25 without the need to rotate either the housing or the cable that is affixed to boss 48. Once this is accomplished, cable support housing 25 is then threadably secured to spout 12 of faucet 10, as seen in FIG. 1. At no time is the cable rotated or caused to be moved when one needs to remove the hose from a faucet or change the location of the hose to another faucet. Thus, once the anti-kinking device 15 is mounted to the hose it never needs to be removed from the hose because of the cooperation between coupling member 18 and rotatable female connector 28.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What we claim is:

1. An anti-kinking device for a hose adapted to be mounted between the hose and a water faucet, said anti-kinking device comprising:
   a cable support housing defined by a tubular body having an inlet end and an outlet end, wherein said outlet end is formed having means for securing said tubular body to said inlet end of the hose, and wherein said tubular body includes means for fixedly attaching said cable to said tubular body which is defined as an elongated boss member formed in said tubular body;
   a connecting means rotatably mounted to said inlet end of said tubular body, whereby said tubular body is mounted to the water faucet;
   a cable member fixedly secured internally of said tubular body and positioned to be received within the hose substantially along the full length thereof.

2. An anti-kinking device for a hose as recited in claim 1, wherein said boss is formed on the inner wall of said tubular body and includes a longitudinal bore formed therein, and wherein one end of the cable is fixedly secured in said bore.

3. An anti-kinking device for a hose as recited in claim 2, including means for securing said cable in said bore.

4. An anti-kinking device for a hose as recited in claim 3, wherein said connecting means defines a coupling connector rotatably mounted adjacent the inlet end of said tubular body, and including means for rotatably mounting said coupling connector to said tubular body.

5. An anti-kinking device for a hose as recited in claim 4, wherein said coupling connector is defined by an internally threaded annular wall having an open end and a mounting end, and wherein said means for rotatably mounting said coupling connector to said tubular body comprises an annular flange member formed in said mounting end and an annular groove formed in said upper end of said tubular body, said flange being rotatably received in said annular groove.

6. An anti-kinking device for a hose as recited in claim 5, wherein said cable is formed from nylon material.

7. In combination with a hose of the garden variety having an inlet female connecting end and an outlet male connecting end, and wherein an anti-kinking device is mounted to the inlet female connection end of the hose, the improvement comprising:
   a cable support housing defined by tubular body having an inlet end and outlet end, wherein said outlet end is formed having threads so as to be secured to the inlet female connecting end of the hose;
   a coupling means rotatably mounted to said inlet end of said tubular body, whereby said tubular body is mounted to a water valve means;
   a semi-rigid cable fixedly secured to said tubular body and positioned to be received within the hose substantially along the full length thereof, whereby kinking of the hose is prevented; and
   means for fixedly attaching said cable to said tubular body which is defined as an elongated boss member formed in the inner wall of said tubular body so as to project outwardly therefrom to allow said cable to be positioned within said hose.

8. The combination as recited in claim 7, including means for securing said cable in said bore.

9. The combination as recited in claim 8, wherein said cable is formed from nylon material.

* * * * *